(12) United States Patent
Chuang et al.

(10) Patent No.: US 11,977,013 B2
(45) Date of Patent: May 7, 2024

(54) VISCOSITY-SENSING APPARATUS

(71) Applicants: Hsu-Chen Chuang, New Taipei (TW); Shang-Lien Lo, Taipei (TW)

(72) Inventors: Hsu-Chen Chuang, New Taipei (TW); Shang-Lien Lo, Taipei (TW)

(73) Assignee: Taiwan Water & Soil Instrumentation, Inc., New Taipei (TW)

( * ) Notice: Subject to any disclaimer, the term of this patent is extended or adjusted under 35 U.S.C. 154(b) by 71 days.

(21) Appl. No.: 17/944,427

(22) Filed: Sep. 14, 2022

(65) Prior Publication Data
US 2024/0085295 A1  Mar. 14, 2024

(51) Int. Cl.
*G01N 11/02* (2006.01)
*G05D 7/06* (2006.01)
*G01N 11/00* (2006.01)

(52) U.S. Cl.
CPC .......... *G01N 11/02* (2013.01); *G05D 7/0623* (2013.01); *G01N 2011/0066* (2013.01)

(58) Field of Classification Search
CPC .......... G01N 11/02; G01N 2011/0066; G05D 7/0623
See application file for complete search history.

(56) References Cited

U.S. PATENT DOCUMENTS 3,777,549 A * 12/1973 Lodge .................... G01N 11/02
                                                                      73/861.63
2012/0286810 A1* 11/2012 Tsuruta ................ G01N 27/226
                                                                        324/663
2021/0172848 A1*  6/2021 Nour ...................... G01N 11/08

* cited by examiner

*Primary Examiner* — P. Macade Nichols

(57) ABSTRACT

A viscosity-sensing apparatus includes a ring and sensors. The ring is connected to a pipe of a tank. The sensors are connected to an internal face of the ring at various heights. Sludge travels into the ring from the tank through the pipe. The sensors sense values of viscosity of the sludge at various depths in the ring.

15 Claims, 6 Drawing Sheets

VISCOSITY-SENSING APPARATUS

BACKGROUND OF INVENTION

1. Field of Invention

The present invention relates to a valve for controlling a pipe that releases sludge from a tank and, more particularly, to an apparatus for sensing viscosity of sludge to provide precise control over such a valve.

2. Related Prior Art

Sludge is produced when liquid containing solids is settled. This often occurs in a sedimentation tank in a water treatment plant or a primary or secondary sedimentation tank in a sewage treatment plant.

A pump can be used to pump the sludge out of the tank. In this case, the pump must be controlled. If the pump does not pump enough, the tank will be filled with sludge, affecting the quality of effluent from the tank. If the pump pumps too much, it will pump out thin sludge with too much water, and it has been proven to be costly to handle this in further processes.

To solve the foregoing problems, a timer can be used to control the pump. However, this has been proven to be an unsophisticated and unsatisfying approach.

Reactive pump control has been used to control the pump. When sludge is thick, i.e., high in solids, it requires a greater effort to pump the sludge. When the pump is pumping thin sludge, the effort is reduced. If nothing else changes, in a positive displacement pump, the change in the effort appears as a change in the torque in a motor used to drive the pump. However, the determination of the thickness of the sludge via the measurement of the torque in the motor can be affected by mechanical problems with the motor.

Alternatively, the sludge can be released from the tank by gravity only, i.e., without using a pump. In this case, a valve is used to control the release of the sludge from the tank. If the valve is inadequately opened, the tank will be filled with sludge, affecting the quality of effluent from the tank. If the valve is excessively opened, it will release thin sludge with too much water from the tank, leaving a depression cone about in the tank. It has been proven to be costly to handle such thin sludge with too much water in following processes.

Therefore, the present invention is intended to obviate or at least alleviate the problems encountered in the prior art.

SUMMARY OF INVENTION

It is the primary objective of the present invention to provide a precise viscosity-sensing apparatus.

To achieve the foregoing objective, the viscosity-sensing apparatus includes a ring and sensors. The ring is connected to a pipe of a tank. The sensors are connected to an internal face of the ring at various heights. Sludge travels into the ring from the tank. The sensors sense values of viscosity of the sludge at various depths in the ring.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
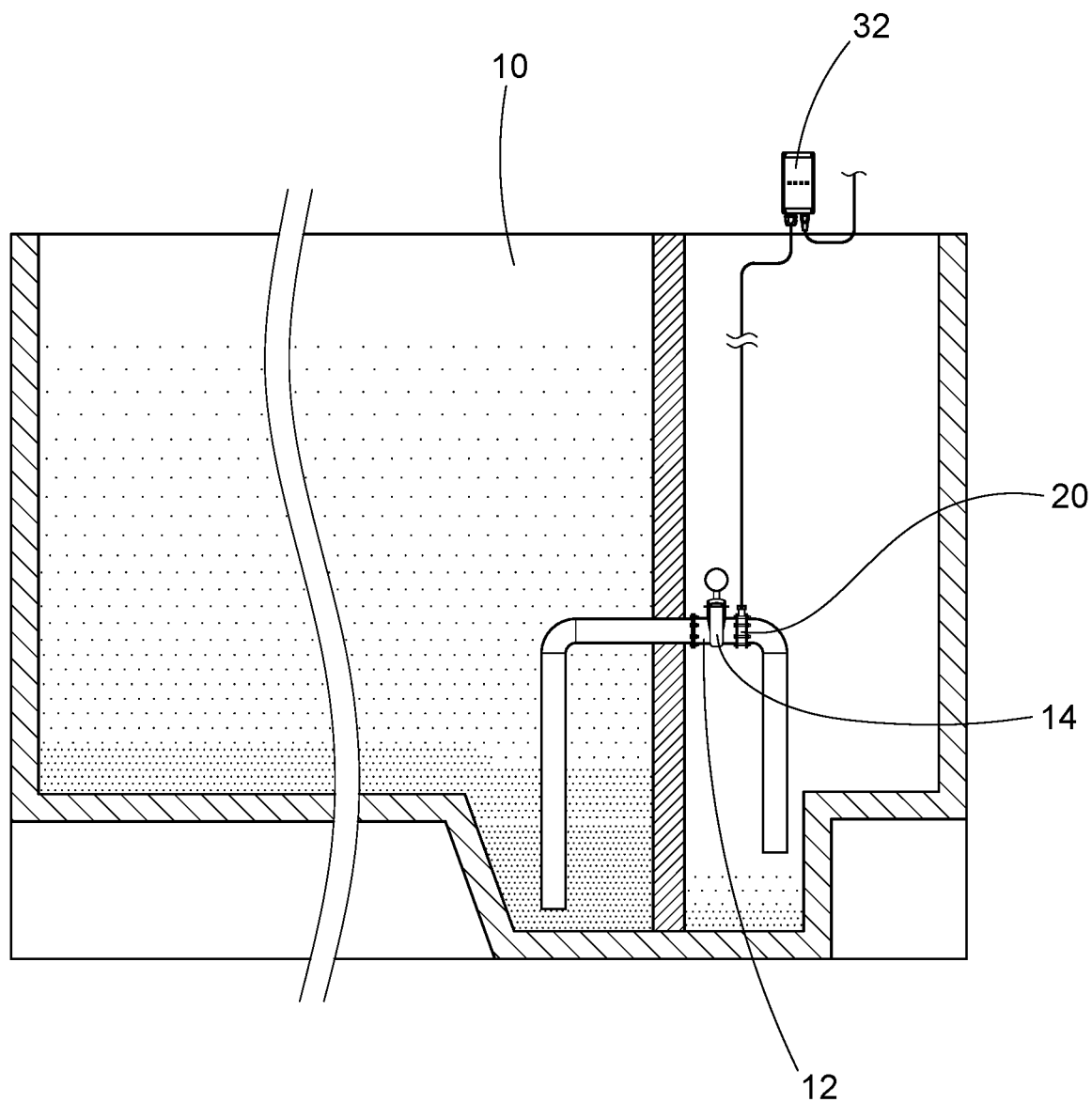
FIG. 1 is a side view of a tank equipped with a viscosity-sensing apparatus for sensing viscosity of sludge released from the tank according to the first embodiment of the present invention.
Figure 2:
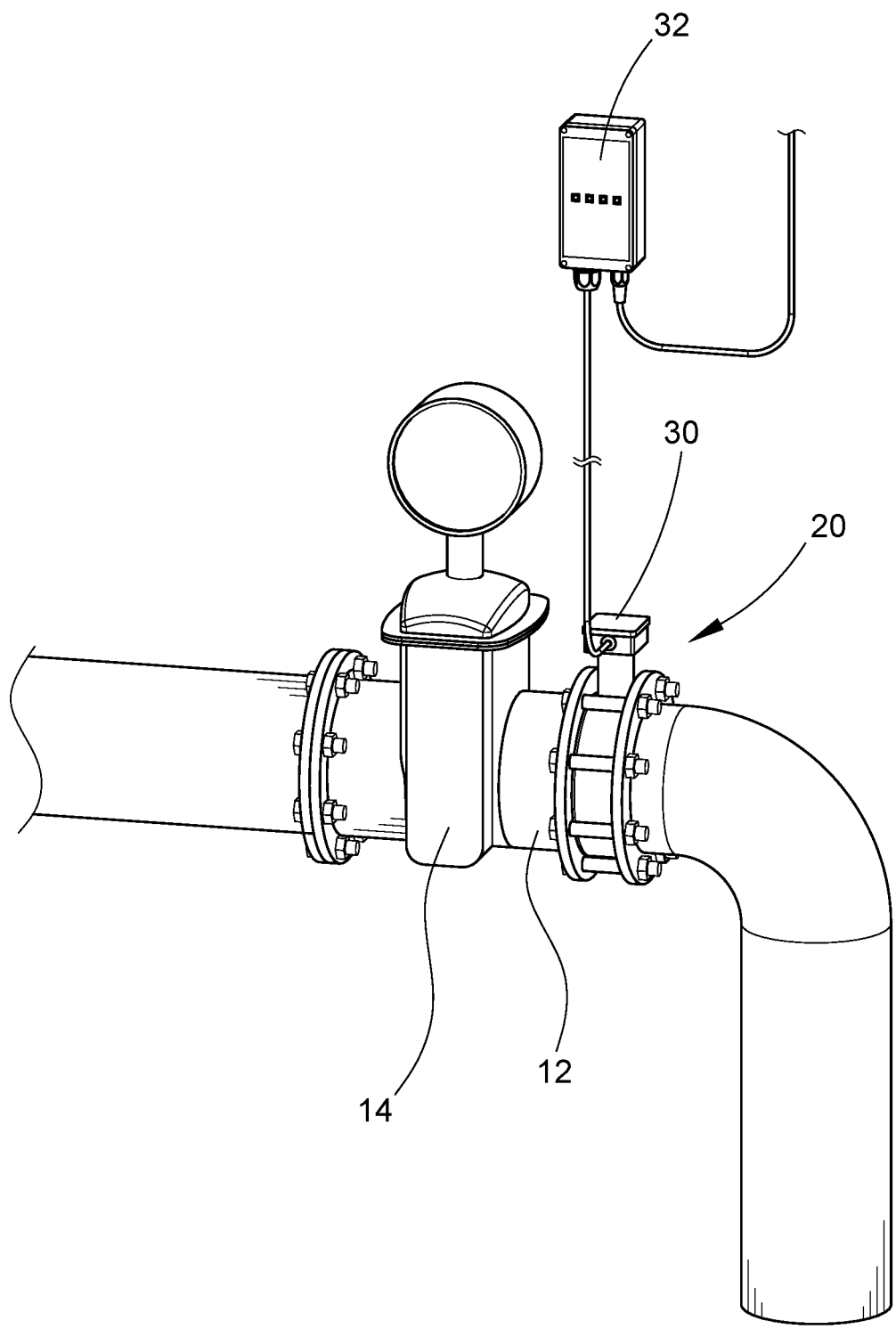
FIG. 2 is a perspective view of a pipe connected to the viscosity-sensing apparatus shown in FIG. 1.

Referring to FIGS. 1 and 2, a tank 10 is provided with a viscosity-sensing apparatus 20, a converter 30 and a controller 32 according to the first embodiment of the present invention. The tank 10 can be a sedimentation tank in a water treatment plant or a primary or secondary sedimentation tank in a sewage treatment plant. Sludge travels into the viscosity-sensing apparatus 20 from the tank 10. The viscosity-sensing apparatus 20 senses values of viscosity of the sludge in it. The controller 32 receives the values of viscosity from the viscosity-sensing apparatus 20 through the converter 30. On determining a change in the values of viscosity, the controller 32 reduces or stops the release of the sludge from the tank 10.

The tank 10 includes a pipe 12 and a valve 14. The pipe 12 is connected to a lower portion of the tank 10. The pipe 12 is used to release sludge from the tank 10. The valve 14 is located on the pipe 12. The valve 14 is used to control the release of the sludge from the tank 10 via the pipe 12. The valve 14 can be opened to allow the release of the sludge from the lower portion of the tank 10 due to hydraulic pressure caused by water above the sludge. The valve 14 can be closed to stop the release of the sludge.

The viscosity-sensing apparatus 20 is connected to the pipe 12. Thus, sludge released from the tank 10 through the pipe 12 is bound to travel throughout the viscosity-sensing apparatus 20.

Figure 3:
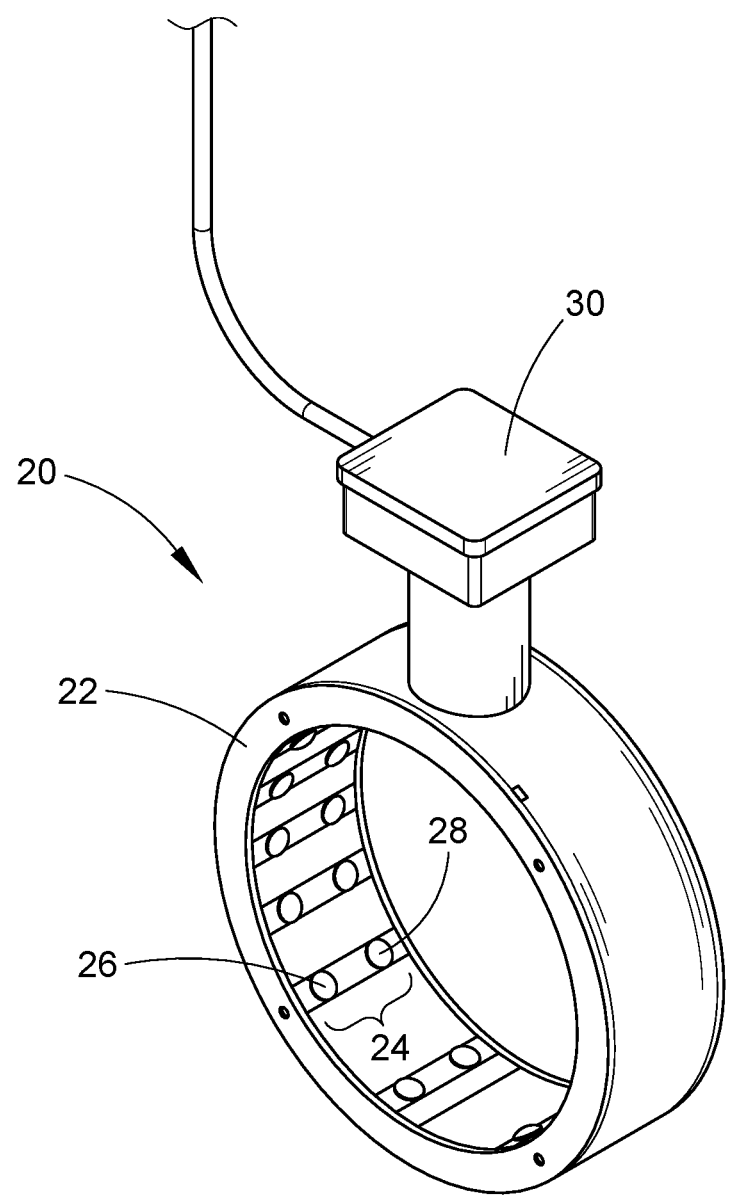
FIG. 3 is a perspective view of the viscosity-sensing apparatus shown in FIG. 2.

Referring to FIG. 3, the viscosity-sensing apparatus 20 includes a ring 22 and sensors 24 arranged on an internal face of the ring 22. The converter 30 is located on the ring 22. Each of the sensors 24 is connected to the converter 30 via a wire. Each of the sensors 24 includes two electrodes 26 and 28. Each of the sensors 24 is used to sense or measure a value of conductivity for example. In this use, the conductivity gets larger as the viscosity gets larger. Hence, a value of viscosity of the sludge between the electrodes 26 and 28 of each of the sensors 24 is derived from the corresponding value of conductivity. A value of concentration or density of sludge can be derived from a corresponding value of conductivity where the tank 10 is a sedimentation tank of a water treatment plant.

Figure 4:
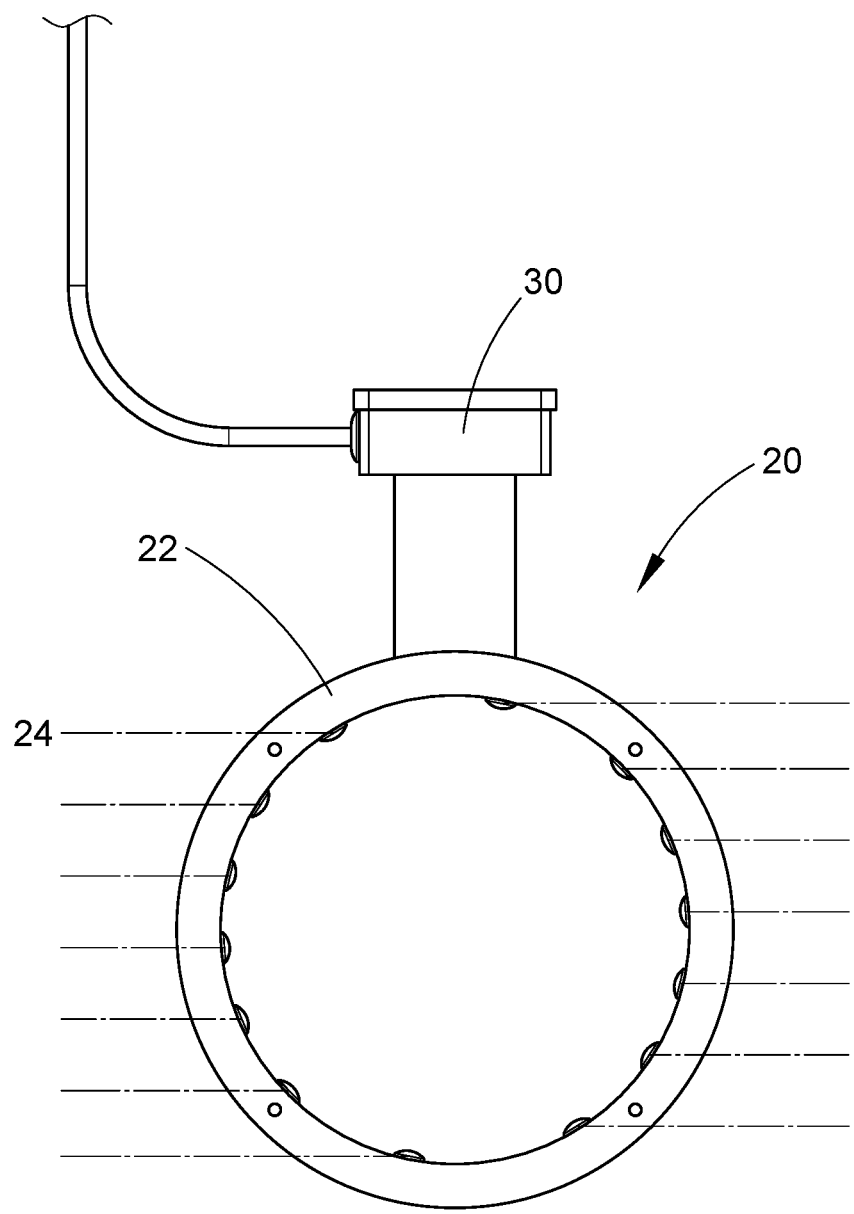
FIG. 4 is a front view of the viscosity-sensing apparatus depicted in FIG. 3.

Referring to FIG. 4, the sensors 24 are arranged at various heights in the ring 22. Preferably, a difference between the heights of any adjacent two of the sensors 24 is substantially identical to a difference between the heights of any other adjacent two of the sensors 24. Thus, the sensors 24 are used to sense values of viscosity of the sludge at various depths in the ring 22. The electrodes 26 and 28 of each of the sensors 24 are located in a horizontal line, i.e., at a same height. A gap (or "space") between the electrodes 26 and 28 of each of the sensors 24 is identical to the gap between the electrodes 26 and 28 of another one of the sensors 24. Thus, the sensors 24 are identical to one another regarding the precision. Thus, precise is determination of occurrence of thin sludge to be described. The sensors 24 are arranged on both halves of the internal face of the ring 22 divided by a vertical line. Regarding the height, the sensors 24 on the left half are arranged alternately with the sensors 24 on the right half.

Figure 5:
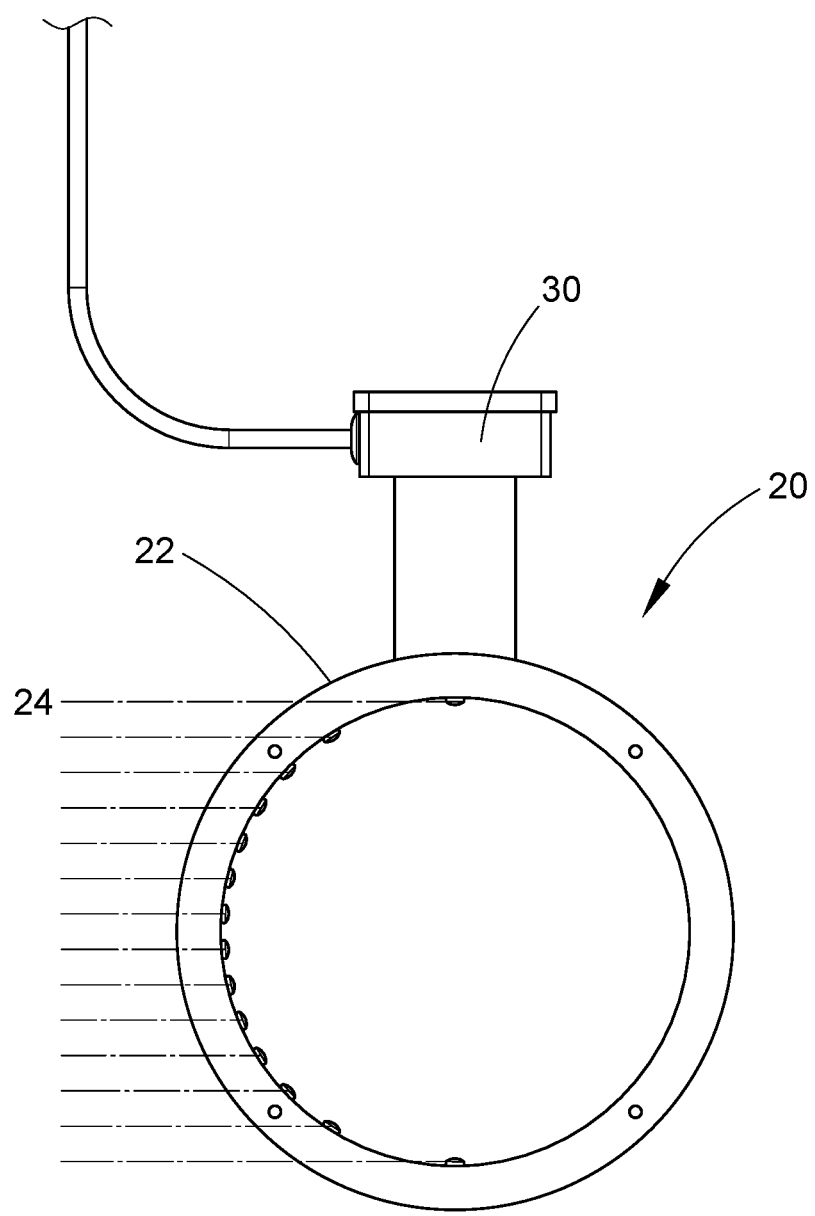
FIG. 5 is a front view of a viscosity-sensing apparatus according to the second embodiment of the present invention.

Referring to FIG. 5, there is shown a viscosity-sensing apparatus according to a second embodiment of the present invention. The second embodiment is identical to the first embodiment except that the sensors 24 are located on only one of the halves of the internal face of the ring 22.

Figure 6:
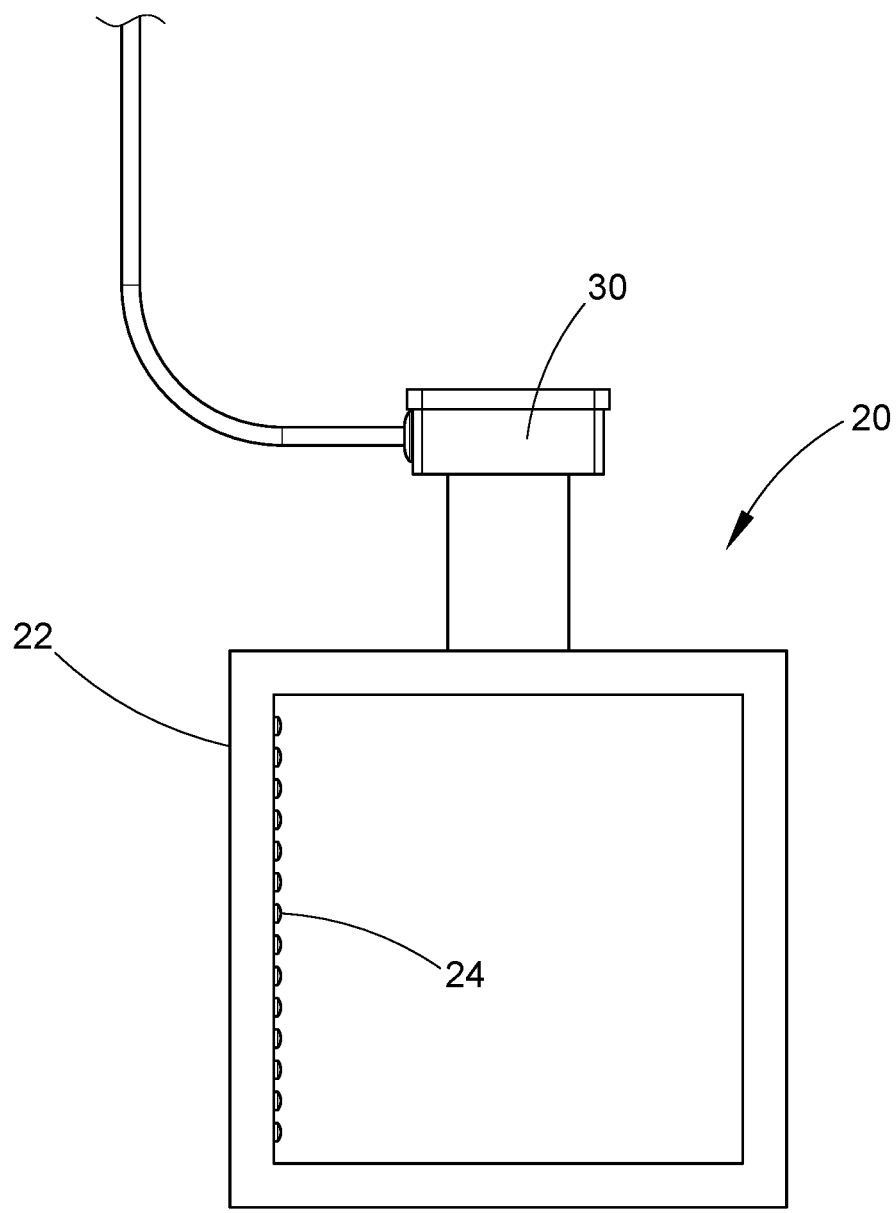
FIG. 6 is a front view of a viscosity-sensing apparatus according to the third embodiment of the present invention.

Referring to FIG. 6, there is shown a viscosity-sensing apparatus according to a third embodiment of the present invention. The third embodiment is identical to the second embodiment but that the ring 22 is a rectangular ring formed with two vertical sections. The sensors 24 are located on the internal face of only one of the vertical sections of the rectangular ring 22.

Nevertheless, the three embodiments can all be used to precisely sense the values of viscosity at the different depths of the sludge. The values of viscosity at the different depths of the sludge can be used to determine whether the valve 14 releases thin sludge from the tank 10. In the following description, the amount of the sensors 24 is assumed to be twelve (12) for example.

If the values of viscosity measured by the first to third sensors 24 from the top (an upper quarter of the sensors 24) are considerably lower than the values of viscosity measured by the fourth to twelfth sensors 24 from the top (three lower quarters of the sensors 24), it is determined that the valve 14 releases mildly thin sludge from the tank 10. Accordingly, a warning is given and the valve 14 is operated to reduce the release of the sludge through the pipe 12.

If the values of viscosity sensed by the first to sixth sensors 24 from the top (an upper half of the sensors 24) are considerably lower than the values of viscosity sensed by the seventh to twelfth sensors 24 from the top (a lower half of the sensors 24), it is determined that the valve 14 releases gravely thin sludge from the tank 10. Accordingly, a warning is given, and the vale 14 is operated to close the pipe 12.

It should be noted that the sensing apparatus 20 is used to sense the values of viscosity periodically such as once for every 1 to 3 seconds. Hence, a sum of the values of viscosity can alternatively be used as an indicator. If there is little difference between the values of viscosity sensed by any adjacent two of the sensors 24 in a round of sensing but the sum of the values of viscosity in a round of sensing is considerably smaller than the sum of the values of viscosity in a previous round of sensing, it is determined that the sludge from the tank 10 via the valve 14 has gotten thinner. Accordingly, a warning is given and/or the valve 14 is operated to close the pipe 12.

When there is barely any sludge in the tank 10, the valve 14 is closed, and the values of viscosity sensed (of air or water) by the sensing apparatus 20 are substantially constant. When there is a considerable amount of sludge in the tank 10, the valve 14 is opened. The sensing apparatus 20 quickly determines the coming of the sludge that is thick by sensing rising of the values of viscosity. After a period of time such as 10 seconds to 10 minutes, the sensing apparatus 20 senses dropping of the values of viscosity to determine that the sludge is gravely thin, and the valve 14 is accordingly closed. How to determine that there is a considerable amount of sludge in the tank 10 is not discussed here for not being the spirit of the present invention.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A viscosity-sensing apparatus comprising:
a ring (22) connected to a pipe (12) of a tank (10);
sensors (24) connected to an internal face of the ring (22) at various heights to sense values of viscosity at various depths of sludge that travels from the tank (10) through the ring (22).

2. The viscosity-sensing apparatus according to claim 1, wherein a distance between the heights of any adjacent two of the sensors (24) is substantially identical to a distance between the heights of any other adjacent two of the sensors (24).

3. The viscosity-sensing apparatus according to claim 2, wherein each of the sensors (24) comprises two electrodes (26, 28), wherein a gap between the electrodes (26, 28) of each of the sensors (24) is identical to the gap between the electrodes (26, 28) of another one of the sensors (24).

4. The viscosity-sensing apparatus according to claim 3, wherein the electrodes (26, 28) of each of the sensors (24) are arranged along a horizontal line so that they are at a same height.

5. The viscosity-sensing apparatus according to claim 1, wherein the sensors (24) are arranged along the internal face of the entire ring (22).

6. The viscosity-sensing apparatus according to claim 1, wherein the sensors (24) are arranged along the internal face of a half of the ring (22).

7. The viscosity-sensing apparatus according to claim 1, wherein the ring (22) is a circular ring.

8. The viscosity-sensing apparatus according to claim 1, wherein the ring (22) is a rectangular ring, wherein the sensors (24) are arranged along the internal face of a vertical section of the ring (22).

9. The viscosity-sensing apparatus according to claim 8, wherein the ring (22) is a square ring.

10. The viscosity-sensing apparatus according to claim 1, further comprising a converter (30) located on the ring (22), wherein each of the sensors (24) is connected to the converter (30) via a wire.

11. The viscosity-sensing apparatus according to claim 10, further comprising a controller (32) connected to the converter (30) via a cable to read the values of viscosity sensed by the sensors (24) and precisely operate a valve (14) to avoid release of gravely thin sludge from the tank (10).

12. A method for controlling a valve used to release sludge from a tank via a pipe comprising the steps of:
providing the viscosity-sensing apparatus according to claim 1;
sensing values of viscosity of the sludge at various depths;
determining that the valve release mildly thin sludge from the tank via the pipe if the value of viscosity sensed by the $M^{th}$ sensor from the top is considerably lower than the value of viscosity sensed by the $M+1^{th}$ sensor from the top, wherein M is a natural number;
determining that the valve releases gravely thin sludge from the tank via the pipe if the value of viscosity sensed by the $N^{th}$ sensor from the top is lower than the value of viscosity sensed by the $N+1^{th}$ sensor from the top, wherein N is a natural number larger than M.

13. The method according to claim 12, further comprising the steps of giving a warning and allowing the valve to open the pipe after determining that the valve releases mildly thin sludge from the tank via the pipe.

14. The method according to claim 12, further comprising the steps of giving a warning and operating the valve to close the pipe after determining that the valve releases gravely thin sludge from the tank via the pipe.

15. The method according to claim 12, further comprising the steps of:
- using the sensors (24) to execute a round of sensing the values of viscosity for every period of time;
- calculating a sum of the values of viscosity for every round of sensing; and
- determining that the sludge from the tank (10) has gotten thinner and accordingly giving a warning and closing the pipe (12) if there is little difference between the values of viscosity sensed by any adjacent two of the sensors (24) in a round of sensing but the sum of the values of viscosity in a round of sensing is smaller than the sum of the values of viscosity in a previous round of sensing.

\* \* \* \* \*